(12) United States Patent
Jubien et al.

(10) Patent No.: US 7,421,084 B2
(45) Date of Patent: Sep. 2, 2008

(54) DIGITAL INTERFACE FOR ANALOG AUDIO MIXERS

(75) Inventors: Christopher Michael Jubien, Victoria (CA); Andreas Teunis Martinus Kappers, Victoria (CA); Benjamin Seth Olswang, Seattle, WA (US); Daniel Martin Steinberg, Oceanside, CA (US)

(73) Assignee: LOUD Technologies Inc., Woodinville, WA (US)

( * ) Notice: Subject to any disclaimer, the term of this patent is extended or adjusted under 35 U.S.C. 154(b) by 0 days.

(21) Appl. No.: 11/329,838

(22) Filed: Jan. 11, 2006

(65) Prior Publication Data

US 2006/0152398 A1 Jul. 13, 2006

Related U.S. Application Data

(60) Provisional application No. 60/643,393, filed on Jan. 11, 2005.

(51) Int. Cl.
*H04B 1/00* (2006.01)
(52) U.S. Cl. .......................................... 381/119; 700/94
(58) Field of Classification Search ................... 700/94; 381/119, 61; 369/1, 4; 84/625, 660, 697
See application file for complete search history.

(56) References Cited

U.S. PATENT DOCUMENTS

| 4,885,792 | A | * | 12/1989 | Christensen et al. ........ 381/119 |
| 4,993,073 | A | * | 2/1991 | Sparkes ...................... 381/119 |
| 5,297,231 | A | | 3/1994 | Miller |
| 5,402,501 | A | | 3/1995 | Silfvajt et al. |
| 5,524,060 | A | | 6/1996 | Silfvast et al. |
| 5,881,317 | A | * | 3/1999 | Hampsten et al. ............. 710/62 |
| 6,041,080 | A | * | 3/2000 | Fraisse ...................... 375/242 |
| 6,259,957 | B1 | * | 7/2001 | Alexander et al. ............ 700/94 |
| 6,353,169 | B1 | | 3/2002 | Juszkiewicz et al. |
| 6,466,672 | B1 | | 10/2002 | Steers |
| 6,639,142 | B2 | * | 10/2003 | Takahashi .................... 84/609 |
| 6,642,876 | B2 | * | 11/2003 | Subramoniam et al. ..... 341/144 |

(Continued)

OTHER PUBLICATIONS

Syntrillium Software Corporation, "Cool Edit User's Manual", 1992-1996, Versions 1.53 and 95, pp. 1-4, 15,30.*

(Continued)

*Primary Examiner*—Vivian Chin
*Assistant Examiner*—Jason Kurr
(74) *Attorney, Agent, or Firm*—Christensen O'Connor Johnson Kindness PLLC (57) ABSTRACT

An analog-digital interface device is provided, which is configured to be housed within or removably coupled with an analog mixer, to thereby form a digital-output analog mixer. The analog-digital interface device includes analog-digital conversion circuitry and digital transmission circuitry that convert analog audio from the analog mixer to digital format for transmission along a digital transport interface to an external digital computing device, such as a PC or MAC computer. In one embodiment, the analog audio can be tapped from any one or more points along a signal path of the analog mixer and sent to the analog-digital interface device. In another embodiment, the analog-digital interface device is further configured to receive digital signals back from the external digital computing device, convert them to analog signals, and return them to the analog mixer at any one or more points along a signal path of the analog mixer.

4 Claims, 9 Drawing Sheets

U.S. PATENT DOCUMENTS

| | | |
|---|---|---|
| 6,686,530 B2 | 2/2004 | Juszkiewicz et al. |
| 6,888,057 B2 | 5/2005 | Juszkiewicz et al. |
| 6,969,797 B2 | 11/2005 | Brinkman et al. |
| 2005/0259532 A1* | 11/2005 | Roman et al. ............... 369/47.1 |

OTHER PUBLICATIONS

Screen Printout: Cool Edit 1.53, Feb. 23, 1996 "File Properties".*
Yamaha, "02R Digital Recording Console" Owner's Manual, Copyright 1995, pp. 2, 172-190.*

* cited by examiner

DIGITAL INTERFACE FOR ANALOG AUDIO MIXERS

CROSS-REFERENCE TO RELATED APPLICATION

The present application claims the benefit of U.S. Provisional Application No. 60/643,393, filed Jan. 11, 2005.

FIELD OF THE INVENTION

The present invention relates generally to an audio system and, more specifically, to an analog-digital interface device that permits recording analog audio signals from an analog mixer in a digital computing device such as a desktop computer.

BACKGROUND OF THE INVENTION

Analog mixers have been used for many years to combine various audio sources (e.g., electric guitars, keyboards, vocal microphones, etc.) for live and recorded performances. With the advent of computers, a need arose to permit a user to record analog audio from an analog mixer in a personal computer or other digital recording device. To date, recording analog audio in a PC has been achieved based on the use of a dedicated box that may be connected between a PC and an external analog mixer. An external connection to an analog mixer has inherent limitations in that the output of the analog audio to be sent to a PC is accessed (or taken) only at a single fixed location in the analog mixer, usually at a bus section (e.g., a final output point) or at an insert section (e.g., an auxiliary send point).

SUMMARY OF THE INVENTION

To address the limitations of the prior devices, the present invention offers an analog-digital interface device, which can be housed or embedded within an analog mixer, to thereby form a digital-output analog mixer. The digital-output analog mixer may be configured to tap analog audio at any one or more points along a signal path of the analog mixer and to send it to the analog-digital interface device. The analog-digital interface device then converts the received analog audio to digital audio and sends the digital audio to an external digital computing device such as a PC. In one embodiment, the digital-output analog mixer includes a user interface control, which permits a user to select one or more points along a signal path of the analog mixer from which analog audio can be accessed. In some specific embodiments of the present invention, the analog-digital interface device provides up to 18 independent channels of high-quality digital audio (e.g., 24-bit/96 kHz) that can be taken from the analog mixer and plugged into a PC or MAC including supporting software, and up to 2 channels of analog audio that can be sent back from the PC or MAC to the analog mixer for monitoring purposes.

According to one aspect, the present invention provides an analog-digital interface device to be housed within an analog mixer. The analog mixer includes at least one signal path including a channel strip and a bus section. The analog-digital interface device includes analog-digital conversion circuitry and digital transmission circuitry, which convert analog audio to digital format for transmission along a digital transport interface to an external digital computing device.

In one aspect, the channel strip of the analog mixer includes a microphone preamplifier, an equalizer section, auxiliary sends and returns, and a channel volume (fader) control. The bus section of the analog mixer includes master auxiliary sends and returns, a master volume (fader) control, and one or more mixing (group) buses. The analog audio may be tapped from any one or more of these points (or before or after them) forming the channel strip and the bus section.

In accordance with another aspect, the present invention provides an analog audio mixing system with a digital interface. The system includes an analog mixer, an analog-digital interface device coupled with the analog mixer, and a user interface control that permits a user to select one or more points along a signal path of the analog mixer from which analog signals can be tapped and sent to the analog-digital interface device.

According to another aspect, the analog-digital interface device is configured to be removably received within the analog mixer, to thereby form a digital-output analog mixer.

In another aspect, the user interface control includes one or more switches provided for the corresponding one or more points along a signal path of the analog mixer from which analog audio can be tapped, respectively. In one example, by activating one or more switches, the user can tap analog signals at the one or more points which correspond to the one or more activated switches, respectively.

According to yet another aspect, the analog-digital conversion circuitry and digital transmission circuitry of the analog-digital interface device are further configured to receive digital audio signals from an external computing device (e.g., a PC) and convert them to analog format for mixing and routing back into the analog mixer. In this connection, according to a further aspect of the invention, the user interface control may further include one or more switches provided for the corresponding one or more points along a signal path of the analog mixer at which the analog audio converted from the digital audio can enter the analog mixer.

According to a still further aspect of the invention, the analog mixer further includes a second user interface control, which permits a user to adjust audio sample rates, bit depths, and latency for data going to or from the analog-digital interface device.

As will be appreciated from the foregoing, an analog-digital interface device formed in accordance with the present invention provides significant advantages, namely: (1) the ability to access the analog audio at one or more different points along a signal path of an analog mixer, (2) the ability to maintain complete analog mixer functionality while adding to it the independent functionality to carry out analog-to-digital conversion and digital transport of analog audio; and (3) the ability to selectively add or remove the digital interface to or from an analog mixer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
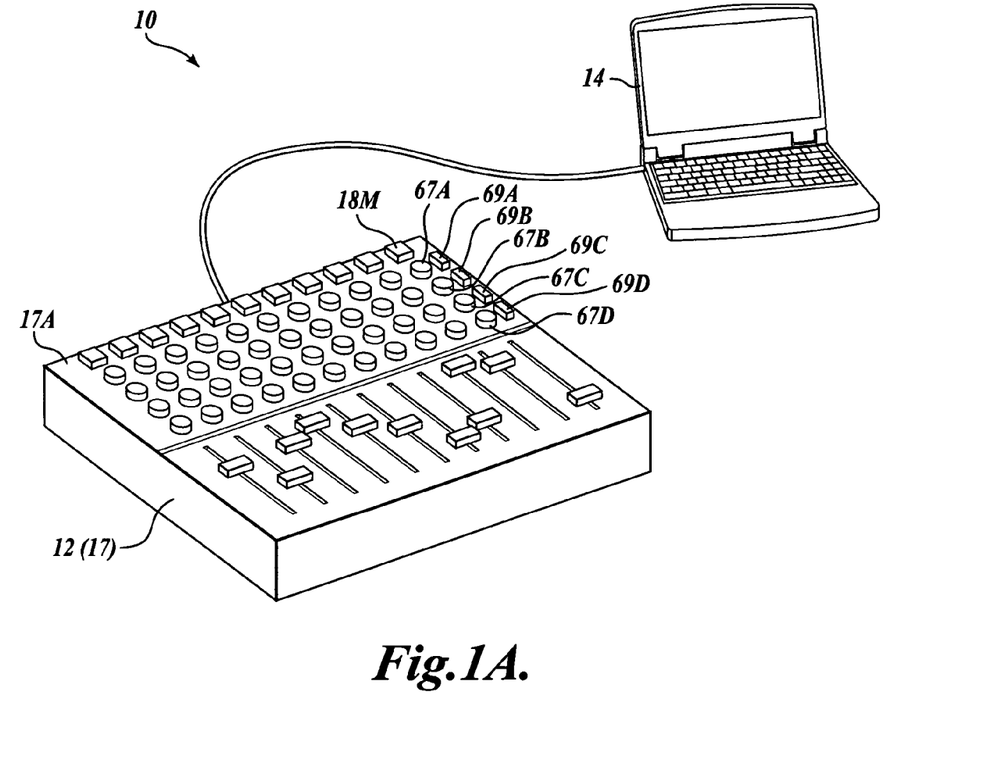
FIG. 1A illustrates an overall arrangement of an analog mixer including an analog-digital interface device (not shown), which is connected to a digital computing device (e.g., laptop PC), in accordance with one embodiment of the present invention.
Figure 1B:
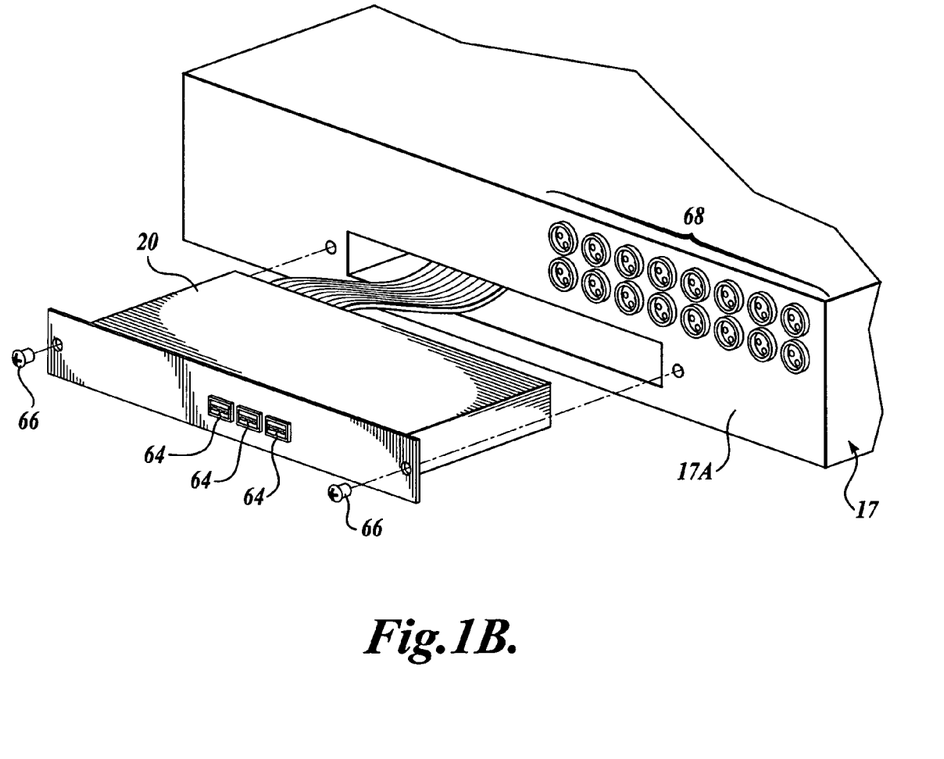
FIG. 1B illustrates a side of the analog mixer of FIG. 1A, showing an analog-digital interface device of the present invention being removably received within the analog mixer.

FIG. 1A illustrates an arrangement of an overall system 10 including a digital-output analog mixer 12, which consists of an analog mixer 17 and an analog-digital interface device (not shown), and a digital computing device 14 such as a laptop PC, which is connected to the digital-output analog mixer 12. The system 10 is suited for being able to tap analog signals from the analog mixer 17 and convert them to digital signals for recording in the digital computing device 14, in accordance with one embodiment of the present invention. FIG. 1B shows a side 17A of the analog mixer 17 of FIG. 1A, through which an analog-digital interface device 20 formed in accordance with the present invention is removably received within the analog mixer 17 to thereby form the digital-output analog mixer 12. FIG. 1B will be described in detail later.

Figure 1C:
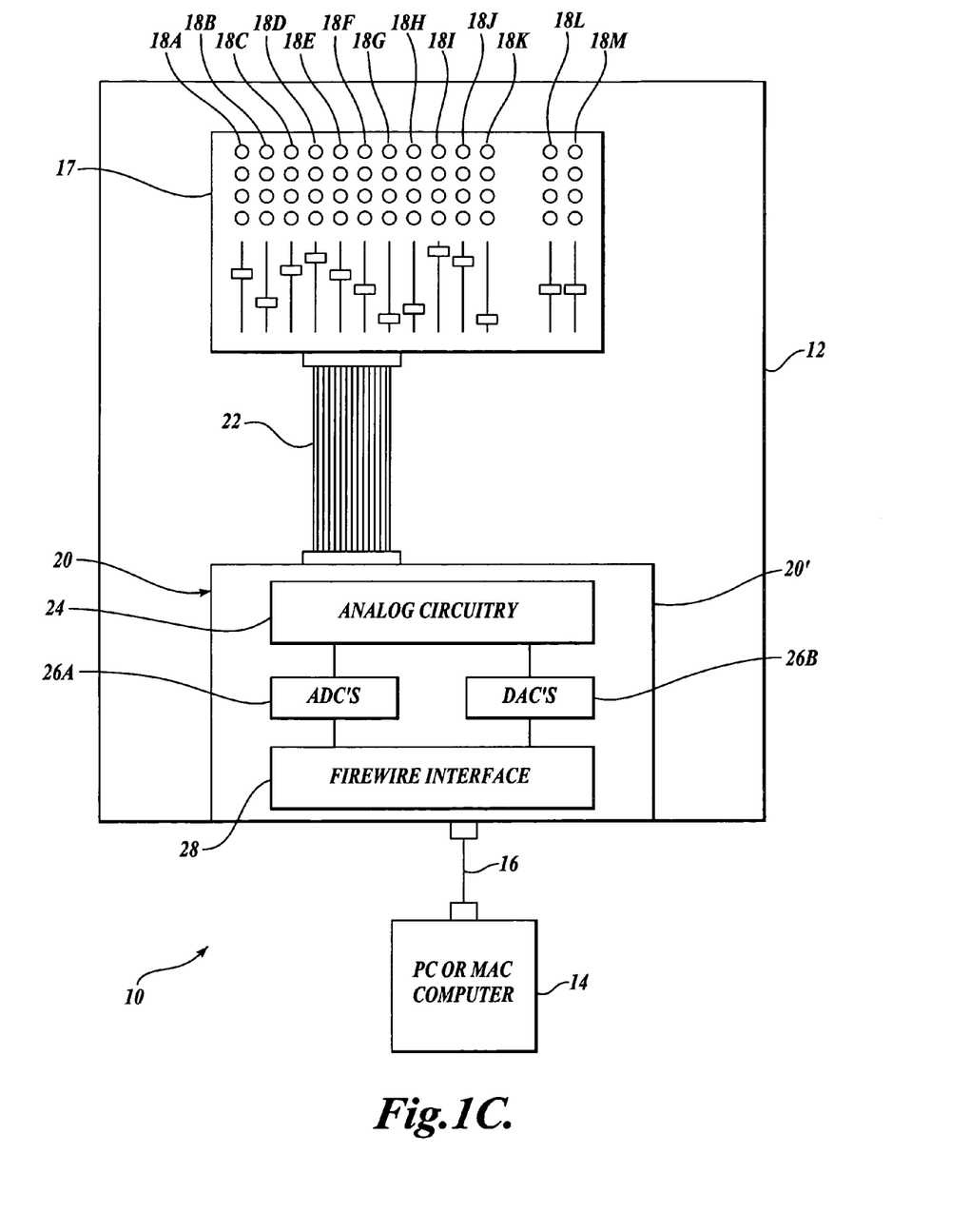
FIG. 1C is a block functional diagram of the arrangement of FIG. 1A, consisting of an analog mixer including an analog-digital interface device and a digital computing device, formed in accordance with one embodiment of the present invention.
Figure 1D:
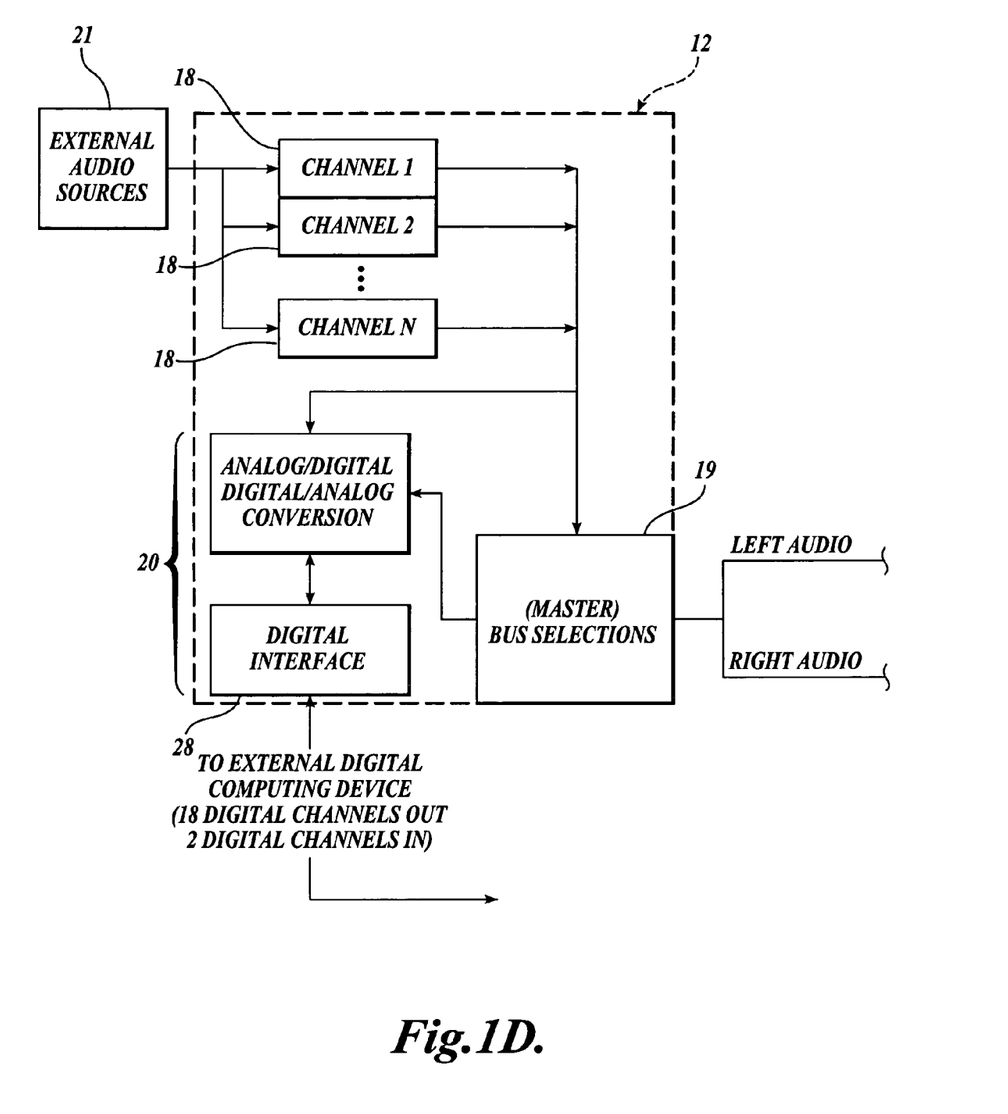
FIG. 1D is a block functional diagram of the analog mixer including an analog-digital interface device, as shown in FIG. 1C.

FIG. 1C is a block functional diagram of the overall system 10 as shown in FIG. 1A, including the digital-output analog mixer 12 and the digital computing device 14 (e.g., PC or MAC computer). It should be understood that the digital computing device 14 may be any computing device having multitrack recording functionality, and thus is not limited to a PC or MAC personal computer. The digital-output analog mixer 12 is coupled with the digital computing device 14 via a cable 16, such as a FireWire cable. The digital-output analog mixer 12 includes an analog mixer 17 having analog mixing functionality and user interface, as well known in the art, and the analog-digital interface device 20. Referring additionally to FIG. 1D, which is a block functional diagram of the digital-output analog mixer 12, the analog mixer 17 typically includes a plurality of audio channels or channel strips 18 (18A-18M are shown in FIG. 1C) and a plurality of bus sections (e.g., master bus sections) collectively referred to as 19 in FIG. 1D. As well known and understood by one skilled in the art of audio processing, each of the channel strips 18 typically includes a microphone preamplifier, an equalizer section, a plurality of auxiliary send/return controls, and a channel volume (fader) control. The channel strip 18 may include further controls, such as a control for positioning the audio within a stereo or multi-dimensional audio field, and routing switches for sending the channel audio to various destinations within a bus section. As also well known and understood by one skilled in the art, each of the bus sections (e.g., master bus sections) includes a plurality of controls for combining, controlling, and routing the analog audio signals, such as master auxiliary sends and returns, a master volume (fader) control, and one or more mixing (group) buses.

Specifically referring to FIG. 1C, the analog-digital interface device 20 in accordance with one embodiment of the present invention is provided in the form of a FireWire board 20'. The analog mixer 17 and the analog-digital interface device 20 are coupled with each other via a cable 22, for example a ribbon cable, which inputs analog signals from the analog mixer 17 and outputs the same to the analog-digital interface device 20. The analog-digital interface device 20 includes analog circuitry 24, a plurality of analog-to-digital converters (ADCs) 26A, a plurality of digital-to-analog-converters (DACs) 26B, and a FireWire interface 28. In accordance with various exemplary embodiments of the present invention, the analog signals are taken (or accessed) from one or more points along the channel strip or bus section of a signal path of the analog mixer 17, as will be more fully described below in reference to FIGS. 2A and 2B, and are received by the analog circuitry 24. The analog signals are then converted into digital signals by the ADCs 26A. The digital audio from the ADCs 26A is then sent along a digital transport system which, in the illustrated embodiment, is provided in the form of IEEE 1394 FireWire interface 28. As well known in the art, IEEE 1394 is a very fast external bus standard, and various products supporting the 1394 standard are available under the trademarks such as FireWire, i.link, Lynx, High Performance Serial Bus (HPSB), etc. Accordingly, as used herein, "IEEE 1394 device" refers to any bus device that supports the high speed data transfer as defined under the 1394 standard. Alternatively, the FireWire interface 28 (or any IEEE 1394 device) can be replaced with other types of high-speed data interface systems, such as an interface utilizing USB 2.0 technology or an interface utilizing any other high-speed data interface system that is currently available or to be developed in the future.

Referring to FIG. 1D, the digital-output analog mixer 12 receives audio from a plurality of external audio sources 21 (e.g., electric guitars, keyboards, vocal microphones, etc.) via the plurality of channel strips 18 of the analog mixer 17, respectively. Specifically, referring additionally to FIG. 1B, once the analog-digital interface device 20 is coupled with (e.g., included in) the analog mixer 17 of a table-top format type, for example, to thereby form the digital-output analog mixer 12, connector points 68 of the analog mixer 17 are used to couple various audio sources to the digital-output analog mixer 12. At the same time, the analog-digital interface device 20 in the digital-output analog mixer 12 is coupled to an external digital computing device. A user can then enjoy the complete functionality and user interface of the analog mixer 17, while at the same time being able to record, process, and reproduce the audio signals in the digital domain using the digital computing device 14. As described above, the analog audio signals can be accessed (taken) from any one or more points along the channel strip or the bus section of a signal path of the analog mixer 17, and converted into digital audio signals to be sent to the digital computing device 14. Also, the digital audio signals from the digital computing device 14 can be received by the analog-digital interface device 20 to be converted into analog audio signals and routed to enter the analog mixer 17 at any one or more points along the channel strip or the bus section of its signal path.

Figure 2A:
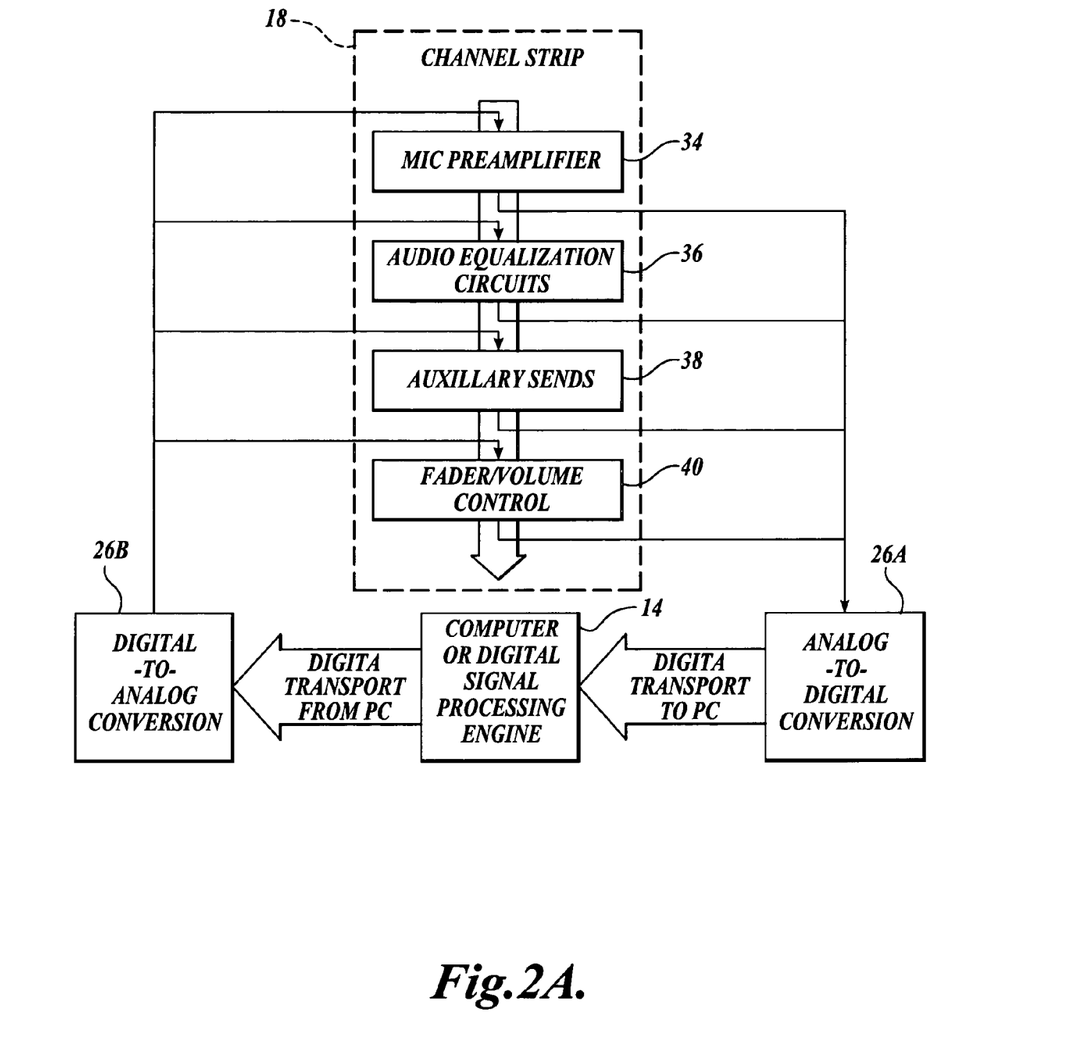
FIG. 2A is a block diagram illustrating the concept of selective tapping and returning of analog signals from and to an analog mixer at any one or more points along a channel strip of a signal path, according to one embodiment of the present invention.
Figure 2B:
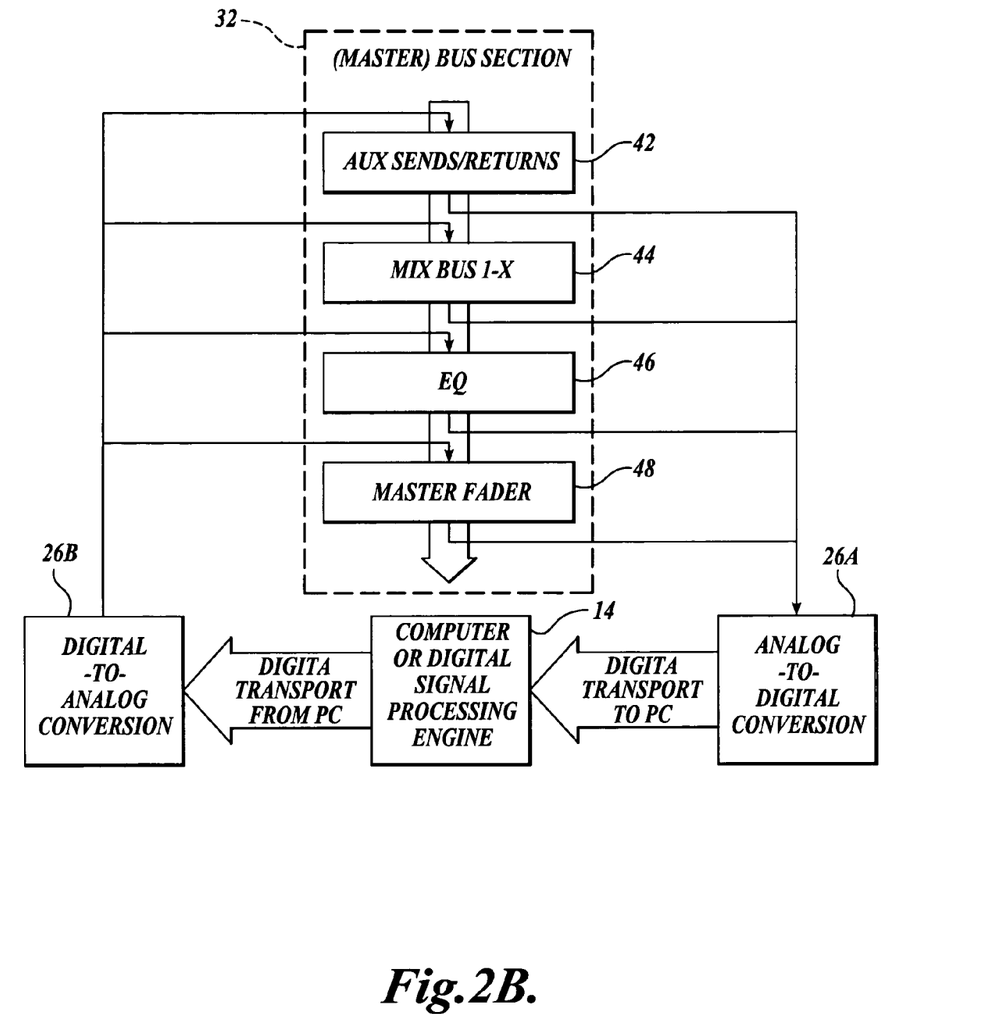
FIG. 2B is a block diagram illustrating selective tapping and returning of analog signals from and to an analog mixer at any one or more points along a bus section of a signal path, according to one embodiment of the present invention.

FIGS. 2A and 2B schematically illustrate how analog signals are taken from and return to one or more points along the channel strip 18 and the bus section 32 (e.g., master bus section), respectively, in the digital-output analog mixer 12 in accordance with various exemplary embodiments of the present invention. In FIG. 2A, the analog signals may be taken at one or more points along the channel strip 18 including: (1) after a microphone preamplifier 34, (2) after audio equalization circuits 36, (3) at auxiliary sends 38 (e.g., before or after an auxiliary send fader or after an auxiliary send insert point), and (4) after a fader/volume control 40.

Referring now to FIG. 2B, the analog signals may also be taken from the bus section 32 at one or more points including: (1) after auxiliary sends/returns 42, (2) after Mix Bus 1-x 44, which is the summation of all channel audio signals, (3) after equalization circuits (EQ) 46, and (4) after a master fader 48.

For example, if a user wishes to access relatively "raw" analog signals (not yet processed via the analog mixer 17) to be digitized and sent to the digital computing device 14, then the user may wish to tap the signals earlier in the channel strip (e.g., after the preamplifier 34 in FIG. 2A). On the other hand, if a user wishes to tap analog signals that have been more fully processed via the analog mixer 17, then the user may wish to access the signals later in the channel strip or the bus section. It should be understood that the various points described above are merely exemplary, and the analog signals may be taken from one or more of any other points along the input channel or bus section of a signal path such as, but not limited to, before a subgroup fader, after a subgroup fader, after a subgroup insert point, after an input channel insert point, and after a main bus insert point.

Accessing and taking analog signals from one or more of such points is possible based on various means, as should be apparent to one skilled in the art, such as by using a series of switches each coupled to one of these points to thereby receive analog signals therefrom. In accordance with various exemplary embodiments of the present invention, the digital-output analog mixer 12 may include a user interface control, which permits a user to select one or more points along a signal path from which analog audio of the analog mixer 17 can be taken and sent to the analog-digital interface device 20. For example, as shown in FIG. 1A, the channel strip 18M includes a microphone preamplifier 67A, an equalizer section 67B, auxiliary sends and returns 67C, and a channel volume (fader) control 67C. The user interface control of the digital-output analog mixer 12 includes four switches 69A-69D, which are located adjacent to and slightly downstream from the channel control elements 67A-67D, respectively, to thereby correspond thereto. Specifically, the switch 69A corresponds to a point after the microphone preamplifier 67A, the switch 69B corresponds to a point after the equalizer section 67B, the switch 69C corresponds to a point after the auxiliary sends and returns 67C, and the switch 69D corresponds to a point after the channel volume (fader) control 67D. In this example, by activating one or more of these switches 69A-69D, the user can tap analog signals from the one or more points which correspond to the activated switches. Though FIG. 1A illustrates the user interface control with respect to only one of the plurality of channel strips, it should be understood that a similar user interface control may be provided for each of the other channel strips also. It should further be understood that such switches may be provided to tap analog signals from one or more points along a bus section (as shown in FIG. 2B) also.

When the analog signals are taken at one or more points along the channel strip or the bus section, as described above, the signals are sent to the ADCs 26A, which convert the signals to digital signals. The digital signals are then sent along a digital transport system, for example according to the IEEE 1394 standard via the FireWire interface 28, to the digital computing system 14 (e.g., PC, MAC computer), where the digital signals are recorded and/or may be further processed.

Still referring to FIGS. 2A and 2B, according to various exemplary embodiments of the present invention, any digital signals recorded or processed in the computing system 14 can then be sent along the same transport system in a plurality of digital audio streams back to the DACs 26B for conversion back to the analog domain. The analog signals are then routed to enter any of the channel strips or the bus sections of the analog mixer 17 at one or more points therealong. For example, referring to FIG. 2A, the analog signals may enter the analog mixer 17 at: (1) before the microphone preamplifier 34, (2) before the audio equalization circuits 36, (3) at the auxiliary sends 38 (e.g., before or after the auxiliary send fader or after the auxiliary send insert point), and (4) before the fader/volume control 40. As further examples, referring to FIG. 2B, the analog signals may enter the analog mixer 17 at (1) before the auxiliary sends/returns 42, (2) before the "Mix Bus 1-x" 44, (3) before the equalization circuits (EQ) 46, and (4) before the master fader 48. It should be understood that the various points described above are merely exemplary, and the analog signals may enter the analog mixer 17 at one or more of any other points along the input channel or the bus section of a signal path, in accordance with the present invention. It should further be understood that a suitable user interface control may be provided to permit a user to select one or more points along a signal path of the analog mixer 17 at which the analog signals from the analog-digital interface device 20 can enter the analog mixer 17. The user interface control may include, for example, switches that are similar to the switches 69A-69D described above and shown in FIG. 1A. It should be understood that the switches illustrated in FIG. 1A form merely one example of a user interface control that permits a user to select desirable locations to tap (or return) analog signals from (or to) the analog mixer 17, and various alternative forms of a user interface control should be obvious to one skilled in the art.

Figure 3:
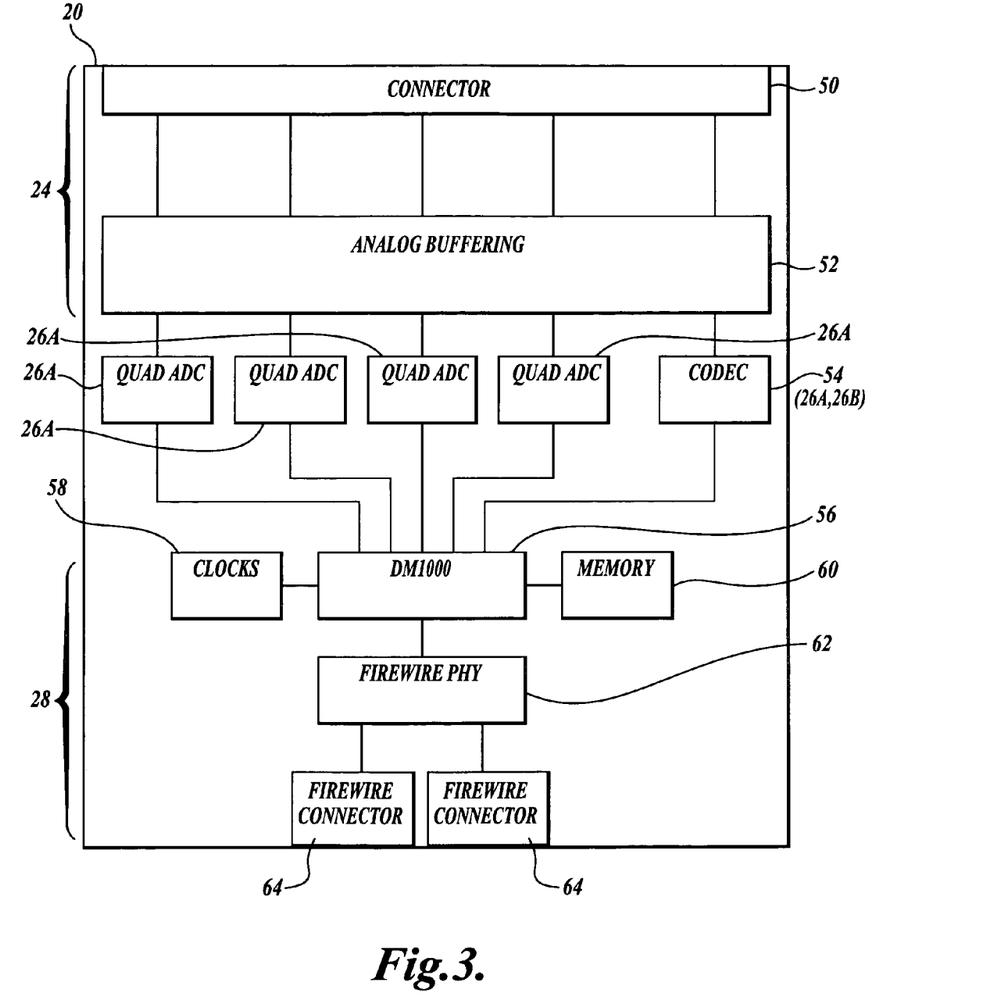
FIG. 3 is a block diagram illustrating the configuration of an analog-digital interface device of FIGS. 1B and 1C according to one embodiment of the present invention.

FIG. 3 is a block diagram of one embodiment of the analog-digital interface device 20, provided in the form of a FireWire board, in accordance with one embodiment of the present invention. The analog-digital interface device 20 includes analog circuitry 24 consisting of a connector 50 and analog buffering 52. The connector 50 is used to mate with the cable 22 (e.g., the ribbon cable 22 of FIG. 1C) that takes the analog signals to and from the analog mixer 17. The analog buffering 52 conditions the incoming analog signals to have the correct amplitude and offset as required by the ADCs 26A and a CODEC (Compression/Decompression module) 54. In one example, the ADC 26A comprises an AK5384 or equivalent, available from AKM Semiconductor or other mixed-signal semiconductor company, which is an audio analog to digital converter that takes 4 analog signals and produces a 24-bit digital replica at a desired sample rate. In one example, the CODEC 54 comprises an AKM4528 or equivalent, available from AKM Semiconductor or other mixed-signal semiconductor company, which contains 2 ADCs 26A and 2 DACs 26B. The ADCs 26A convert analog signals and produce a 24-bit digital replica and the DACs 26B convert 24-bit digital data streams into analog signals.

The FireWire interface 28, which is one example of a high-speed data interface that may be used in accordance with the present invention (see FIG. 1C), includes an interface processor 56, clocks 58, memory 60, a physical layer device (PHY) 62, and interface connectors 64. In the illustrated embodiment, the interface processor 56 comprises a DM1000 or equivalent Firewire processor, available from BridgeCo or other mixed-signal semiconductor company, which is a full-duplex IEEE 1394 interface processor with an integrated FireWire link layer controller. The DM1000 receives and transmits data from and to the (FireWire) PHY 62 and translates the audio data to be sent to and received from the ADCs 26A and CODEC 54 (including ADCs 26A and DACs 26B). The DM1000 also provides a multi-channel audio data patch to a PC via the (FireWire) PHY 62 and handles control information and audio buffering. The clocks 58 are used for the operation of the ADCs 26A and the CODEC 54, and in one embodiment the audio clock is derived from the FireWire bus to be distributed via a CGS2535 clock distributor, available from National Semiconductor Corporation or other semiconductor company. In one embodiment, the memory 60 consists of FLASH memory and SRAM (Static Random Access Memory). FLASH memory is used to store program code for the interface processor 56 (e.g., DM1000) and the SRAM is used for audio buffering. Lastly, the physical layer device (PHY) 62, in the illustrated embodiment, is provided in the form of a FireWire PHY, TSB41AB2, available from Texas Instruments. TSB41AB2 provides the digital and analog transceiver functions needed to implement a cable-based FireWire network. It supports two nodes, or interface connectors 64, and includes circuitry to monitor the line conditions as needed for determining connection status for initialization and arbitration and for packet reception and transmission.

It should be understood by one skilled in the art that the embodiment illustrated in FIG. 3 is merely exemplary, and various different configurations are possible to form an analog-digital interface device 20 in accordance with the present invention.

Referring back to FIG. 1B, one advantage of the analog-digital interface device 20 is that it can be provided in the form of an interface board option card, which can be readily included in and removed from an existing analog mixer 17. In the illustrated embodiment, the analog-digital interface device 20 provided in the form of an option card may be inserted into a corresponding hole defined in one side 17A of the analog mixer 17 and secured therein using suitable means, such as a pair of screws 66 to be received within corresponding holes provided in the side 17A of the analog mixer 17.

Figure 4:
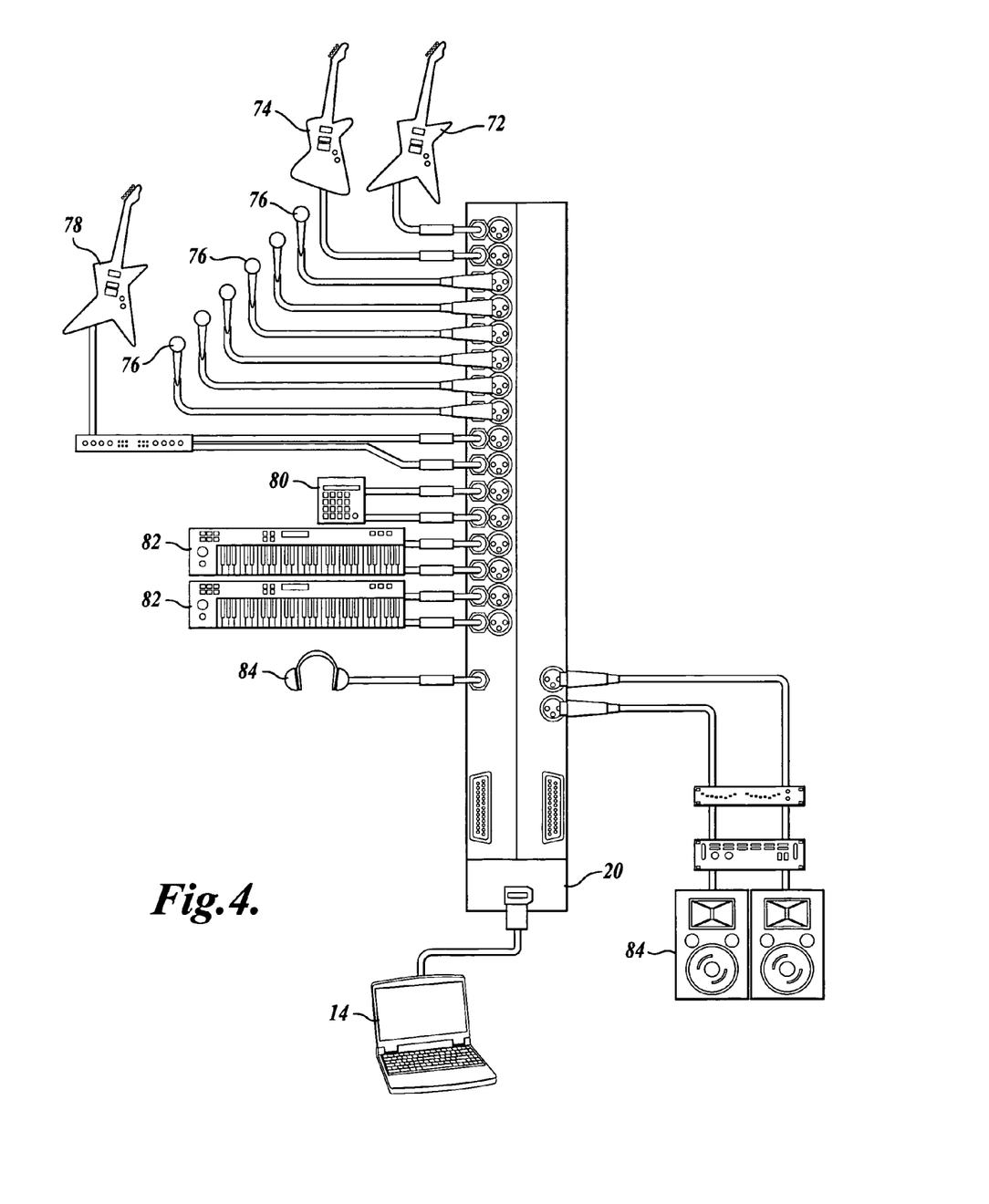
FIG. 4 is a sample hookup diagram illustrating an analog mixer coupled to various audio sources, wherein analog signals from these sources can be selectively tapped from the analog mixer to be digitized and sent to a digital computing device (PC), while digital signals can also be returned from the digital computing device to the analog mixer, in accordance with one embodiment of the present invention.

FIG. 4 is a sample hookup diagram for use in live multi-track recording to a laptop computer 14 using an analog-digital interface device 20 formed in accordance with the present invention. The diagram illustrates various audio sources used in live recording, which are hooked up to an analog mixer 17 including an analog-digital interface device 20, which in turn is coupled to an external digital computing device 14 (e.g., a PC laptop). In the illustrated embodiment, the analog-digital interface device 20 provides a digital direct output for each of 16 channels of the analog mixer 17 to be digitized and sent in digital form to the PC 14, an analog output to be sent to each of two (right and left) speakers 84, and an analog input for each of two channels to be received from the PC 14, converted to analog form, and sent back to the analog mixer 17. In this example, the sixteen channel strips of the analog mixer 17 to be digitized and sent to the PC 14 receive audio signals from an electric guitar 72, a bass guitar 74, six vocal microphones 76, an electric guitar with stereo guitar effects 78 (two inputs), a drum machine 80 (two inputs), and keyboard or other line-level input 82 (four inputs), respectively. The two digital channels coming out of the PC 14 back to the analog-digital interface device 20 and then to the analog mixer 17 may be used to output analog signals via headphones 84 (two outputs), so that a player can monitor the digital signals as recorded in the digital computing device 14.

Figure 5:
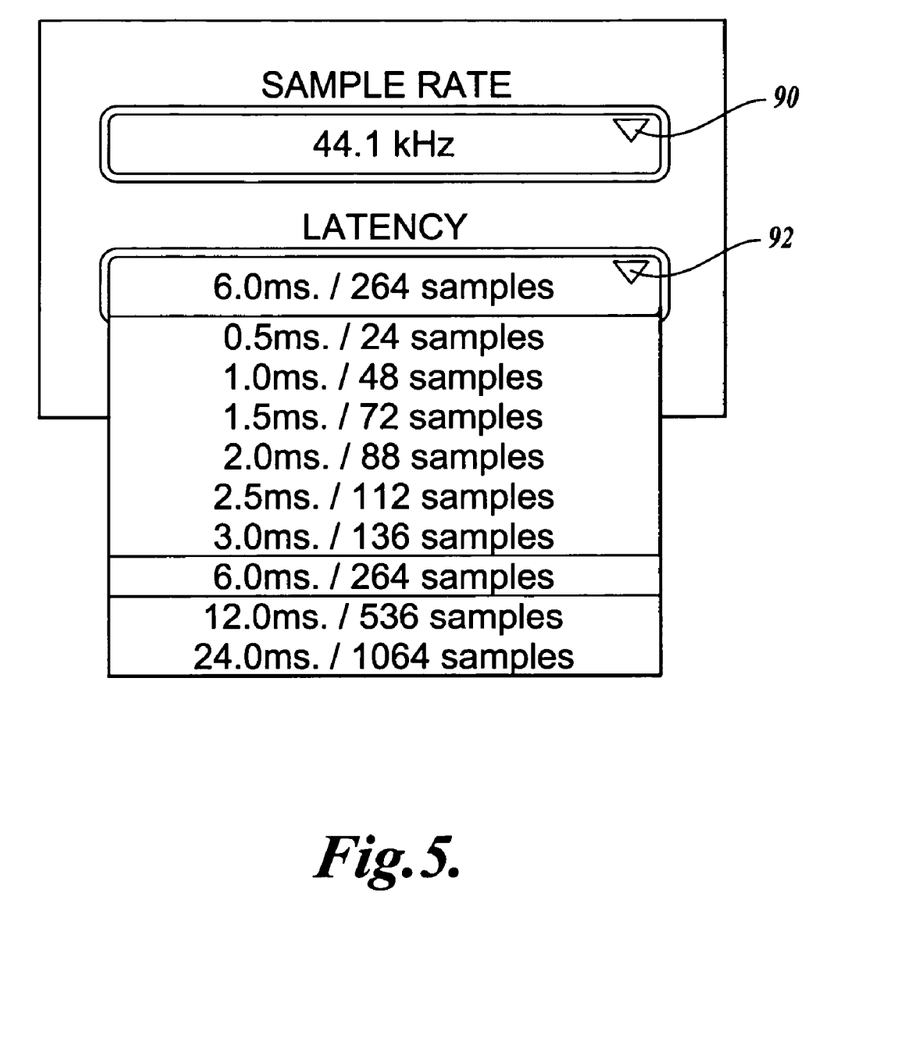
FIG. 5 is a sample user interface control for permitting a user to set a sample rate and latency of an analog mixer.

FIG. 5 is a sample user interface screen that permits a user to control the operation of the analog-digital interface device 20 as used with an analog mixer 17 in accordance with various exemplary embodiments of the present invention. The screen prompts a user to select an analog-to-digital (or digital-to-analog) sample rate in a window 90, and a latency level in a window 92, each with a pull down menu displaying options available to the user. In the illustrated embodiment, the user has selected 44.1 kHz as the sample rate, and 6.0 ms/264 samples as the latency level. The user interface screen may permit a user to set other parameters, such as bit depths, in a similar manner.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An analog audio mixing system with digital interface, comprising:
    an analog mixer including at least one signal path comprising a channel strip and a bus section;
    an analog-digital interface device coupled with the analog mixer, the analog-digital interface device comprising analog-digital conversion circuitry and digital transmission circuitry that convert analog audio to digital format for transmission along a digital transport interface to an external digital computing device; and
    a user interface control that permits a user to select one or more points along the signal path of the analog mixer from which analog signals can be tapped and sent to the analog-digital interface device, wherein the analog-digital interface device is configured to tap analog audio from several points along a signal path of the analog mixer, wherein at each of said points an analog audio signal may be tapped at a different stage of processing so that the tapped analog audio signal is further converted to digital format by the analog-digital interface device for transmission to the external digital computing device to digitally process the converted signal.

2. An analog audio mixing system with digital interface, comprising:
    an analog mixer including at least one signal path comprising a channel strip and a bus section;
    an analog-digital interface device coupled with the analog mixer, the analog-digital interface device comprising analog-digital conversion circuitry and digital transmission circuitry that convert analog audio to digital format for transmission along a digital transport interface to an external digital computing device; and
    a user interface control that permits a user to select one or more points along the signal path of the analog mixer from which analog signals can be tapped and sent to the analog-digital interface device, wherein the analog-digital interface device is configured to return analog signals to several points along a signal path of the analog mixer, wherein the analog signals have been returned after having been digitally processed by the digital computing device and converted from digital format to analog format by the analog-digital interface device.

3. An analog-digital interface device that is configured to be housed within an analog mixer, the analog-digital interface device comprising:

analog-digital conversion circuitry and digital transmission circuitry that convert analog audio from the analog mixer to digital format for transmission along a digital transport interface to an external digital computing device, which is further configured to tap analog audio from several points along a signal path of the analog mixer, wherein at each of said points an analog audio signal may be tapped at a different stage of processing so that the tapped analog audio signal is further converted to digital format by the analog-digital interface device for transmission to the external digital computing device to digitally process the converted signal.

4. An analog-digital interface device that is configured to be housed within an analog mixer, the analog-digital interface device comprising:

analog-digital conversion circuitry and digital transmission circuitry that convert analog audio from the analog mixer to digital format for transmission along a digital transport interface to an external digital computing device, which is further configured to return analog signals at several points along a signal path of the analog mixer, wherein the analog signals have been returned after having been digitally processed by the digital computing device and converted from digital format to analog format by the analog-digital interface device.

\* \* \* \* \*